United States Patent
Baholzer

(10) Patent No.: US 11,154,386 B2
(45) Date of Patent: Oct. 26, 2021

(54) DENTAL FURNACE

(71) Applicant: Vita Zahnfabrik H. Rauter GmbH & Co., KG, Bad Säckingen (DE)

(72) Inventor: Thomas Baholzer, Rickenbach/Egg (DE)

(73) Assignee: VITA ZHAN FABRIK H. RAUTER GMBH & CO. KG, Bad Saeckingen (DE)

( * ) Notice: Subject to any disclaimer, the term of this patent is extended or adjusted under 35 U.S.C. 154(b) by 367 days.

(21) Appl. No.: 16/312,637

(22) PCT Filed: Jul. 6, 2017

(86) PCT No.: PCT/EP2017/067007
§ 371 (c)(1),
(2) Date: Dec. 21, 2018

(87) PCT Pub. No.: WO2018/011061
PCT Pub. Date: Jan. 18, 2018

(65) Prior Publication Data
US 2019/0167395 A1    Jun. 6, 2019

(30) Foreign Application Priority Data

Jul. 12, 2016   (DE) ............... 10 2016 008 463.4

(51) Int. Cl.
*F27B 17/02*    (2006.01)
*A61C 13/20*    (2006.01)
(Continued)

(52) U.S. Cl.
CPC ............ *A61C 13/20* (2013.01); *F27B 17/025* (2013.01); *F27D 1/0036* (2013.01);
(Continued)

(58) Field of Classification Search
None
See application file for complete search history.

(56) References Cited

U.S. PATENT DOCUMENTS 4,208,573 A * 6/1980 Risse ............... A61C 13/20
219/390
6,157,004 A   12/2000 Bizzio
(Continued)

FOREIGN PATENT DOCUMENTS

CN   1254448 C    5/2006
DE   2656288 A1   6/1978
(Continued)

OTHER PUBLICATIONS

Chinese Office Action dated Jul. 15, 2020 for Chinese Patent Appl. No. 2017800423173.
(Continued)

*Primary Examiner* — Monica A Huson
*Assistant Examiner* — Kelsey C Grace
(74) *Attorney, Agent, or Firm* — Ohlandt, Greeley, Ruggiero and Perle, LLP

(57) ABSTRACT

A dental furnace for firing dental-ceramic compounds comprises a firing chamber for receiving ceramic elements to be fired. Further, a heating device for heating and firing the ceramic element is provided. The heating device comprises at least one heating element for producing IR radiation in the range of 0.8-5 μm.

14 Claims, 1 Drawing Sheet

(51) Int. Cl.
*F27D 1/00* (2006.01)
*F27D 99/00* (2010.01)
*F27B 5/14* (2006.01)

(52) U.S. Cl.
CPC ............ *F27D 99/0006* (2013.01); *F27B 5/14* (2013.01); *F27D 2099/0011* (2013.01)

(56) References Cited

U.S. PATENT DOCUMENTS

| | | | |
|---|---|---|---|
| 6,441,346 | B1 | 8/2002 | Zychek |
| 7,017,370 | B1 | 5/2006 | Fotheringham et al. |
| 9,010,153 | B2 | 4/2015 | Saltzer, Jr. et al. |
| 9,784,501 | B2 * | 10/2017 | Jussel .................... A61C 13/20 |
| 2013/0026157 | A1 | 1/2013 | Jussel et al. |

FOREIGN PATENT DOCUMENTS

| | | |
|---|---|---|
| DE | 102004049888 A1 | 4/2006 |
| DE | 29905385 U1 | 8/2008 |
| EP | 2550928 A1 | 1/2013 |
| JP | S5373895 A | 6/1978 |
| JP | 2011012954 A | 1/2011 |
| JP | 2011526874 A | 10/2011 |
| KR | 1020150115713 A | 10/2015 |
| RU | 2552199 C2 | 6/2015 |

OTHER PUBLICATIONS

International Search Report dated Sep. 25, 2017 for PCT application No. PCT/EP2017/067007.
Japanese Office Action (English translation) dated Jul. 13, 2021 for Japanese Appl. No. 2019-500532.

* cited by examiner

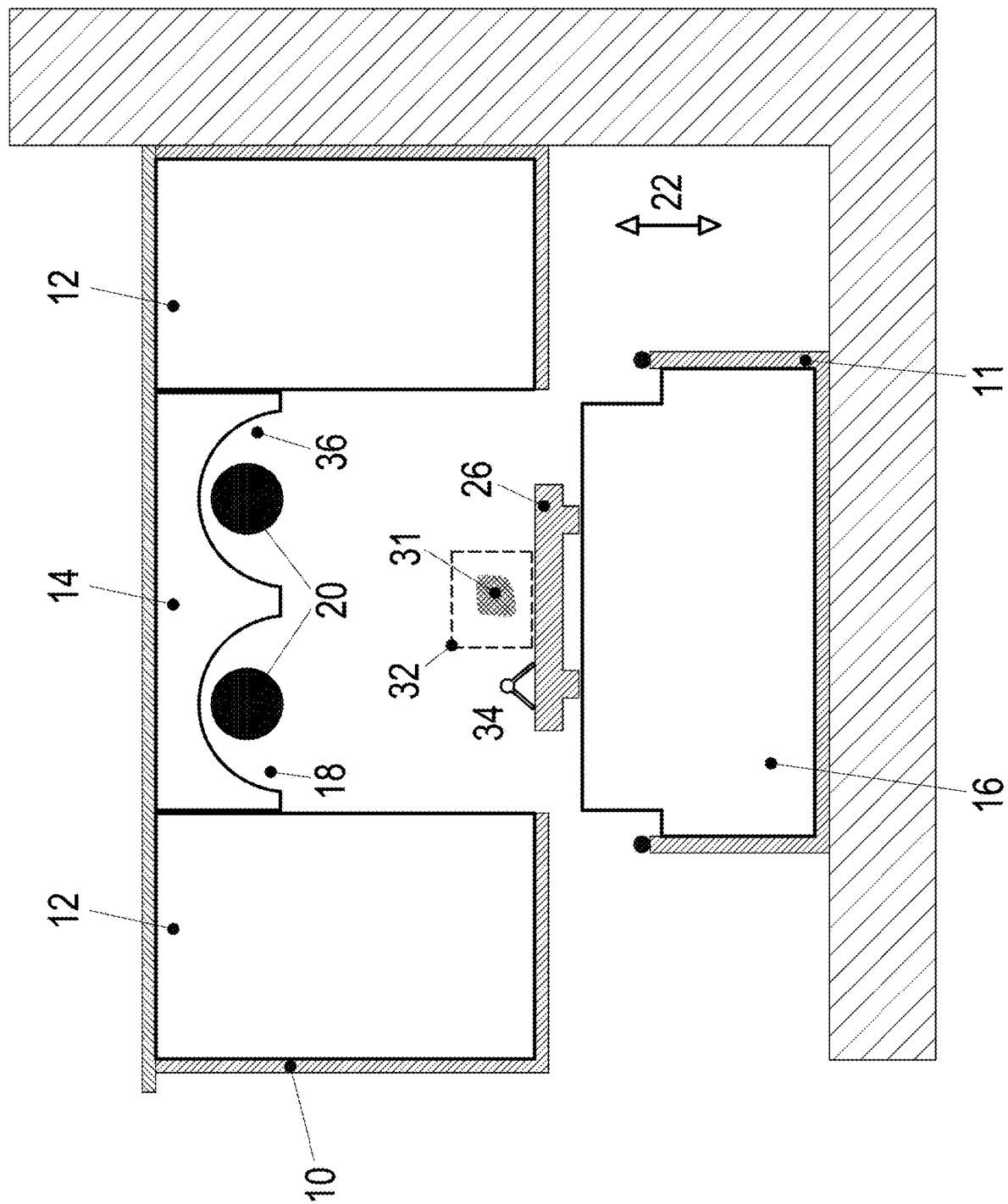

DENTAL FURNACE

BACKGROUND

1. Field of the Disclosure

The disclosure relates to a dental furnace for firing dental-ceramic compounds as well as for firing dental-ceramic compounds onto dental alloys, zirconium oxide and/or other ceramic materials in connection with a liquid substance (mixing liquid).

2. Discussion of the Background Art

Conventional furnaces for dental-ceramic compounds comprise, at least partially, a firing chamber housing adapted to be evacuated. This firing chamber housing is provided with a thermally insulating lining. Prior to firing dental-ceramic compounds, conventional furnaces must be preheated over an extended period of time for setting the thermally insulating lining to a basic temperature. Without such preheating, uniform firing results cannot be achieved and also the predetermined temperature increase per time unit is not ensured. In conventional furnaces, heating elements having resistance wires, in particular of an iron-chromium-aluminum alloy, inserted into a quartz tube are used as heating elements. Such resistance heating elements preferably emit, in a freely radiating manner, infrared radiation in the wavelength range of approximately 2-5 µm in their active glowing condition. The response time of such heating elements, i.e. the time from the cold condition up to reaching the radiation peak, is several minutes.

The infrared radiation emitted by such resistance heating elements causes the surface of the dental-ceramic compound to be heated. This heat on the surface of the dental-ceramic compound is passed on into deeper layers in accordance with their heat conductivity.

Preheating is also required for removing the liquid substance contained in the dental-ceramic compound. Only sufficient preheating and associated evaporation of the liquid substance even from deeper areas of the dental-ceramic compound ensure that the compound does not flake off when being fired.

For preheating and firing the dental-ceramic compound, said compound is placed onto a support for to compound to be fired. This support for the compound to be fired is placed onto the bottom heat insulation. The support for the compound to be fired and the bottom heat insulation form the bottom element.

Prior to firing, the firing chamber is open for the purpose of preheating and removing the contained liquid substance, i.e. the bottom element is located outside the firing chamber. This preheating operation is terminated by stepwise closing of the firing chamber, and the firing operation is started.

According to the properties of the dental-ceramic compound and in accordance with a predetermined firing program, the firing operation is carried out with different program parameters, such as temperature, time and optionally negative pressure.

After termination of the firing operation, the firing chamber is opened and the completed ceramic element can be removed. The firing chamber cools and is kept at the standby temperature up to the next firing operation.

Conventional furnaces are therefore disadvantageous in that they have to be preheated or kept at the operational temperature. This results in a considerable energy consumption. Furthermore, the cycle time, i.e. the time from preheating to completion of the ceramic element to be fired, is very long.

In addition, modern dental-ceramic compounds for producing dental prostheses make higher demands on the firing methods since these dental-ceramic compounds have very small particle sizes (nanoparticles). Thus the demands made on the removal of the contained liquid substance as well as air bubbles have increased. Conventional furnaces can meet these demands only to a limited extent.

It is an object of the disclosure to provide a dental furnace for firing dental-ceramic compounds, where the firing operation is shortened and preferably the quality is improved.

SUMMARY

The dental furnace according to the disclosure for firing dental-ceramic compounds as well as for firing dental-ceramic compounds onto dental alloys, zirconium oxide and/or other ceramic materials in connection with a liquid substance (mixing liquid) comprises a firing chamber for receiving ceramic elements to be fired. The firing chamber preferably comprises a chamber insulation as well as a housing adapted to be evacuated for generating a negative pressure in the firing chamber. Further, the furnace comprises a heating device for preheating the ceramic element and for firing the ceramic element. With the aid of this heating device preferably temperatures of up to 1100° C. can be attained. According to the disclosure, the heating device comprises at least one quick-response heating element, preferably two or more quick-response heating elements which serve for generating infrared radiation in the range of approximately 0.8-5 µm, wherein the energy of the emitted radiation in the wavelength range below 2 µm, as compared with the currently available heating elements, assumes a significantly higher portion within the emission spectrum. The response time of these quick-response heating elements, i.e. the time from the cold condition up to reaching the radiation peak, preferably is a few seconds, in particular less than 10 seconds and particularly preferred less than 5 seconds.

By using these quick-response heating elements, the preheating times of the ceramic elements to be fired can be considerably reduced. The additional IR radiation portion in the wavelength range below approximately 2 µm allows for a larger penetration depth into the dental-ceramic compound. The resultant heating inside the dental-ceramic compound or in its deeper layers leads in a quicker evaporation of the existing liquid substance. This takes place immediately before the heating or firing operation such that the outer layer of the dental-ceramic compound is not already closed by fusion and thus the existing liquid substance can easily escape. Thus despite a shorter preheating phase there is no risk that the ceramic material flakes off a possibly existing supporting structure, which is typically caused by evaporation of liquid in the lower layers of the ceramic material after the surface of the ceramic material has been closed. Due to the use of these quick-response heating elements in the infrared range of approximately 0.8-5 µm according to the disclosure, thus considerably shorter firing times can be realized. Furthermore, preheating is required for a considerably shorter period of time. Thereby, the energy consumption is considerably reduced.

In particular, it is possible to fire a corresponding ceramic element directly in the dentist's surgery or in laboratories. Since the firing operation is performed very quickly and preheating of the furnace is not required, it is possible for the patient to wait during the firing operation, and thus the number of appointments can be considerably reduced. Furthermore, a noticeable energy saving is realized by not continuously keeping the furnace according to the disclosure at a standby temperature if the firing operations are only carried out once in a while. Rather, the furnace according to the disclosure can be immediately used. Consequently, an undesired heating of the surroundings of the furnace does not takes place.

According to a particularly preferred embodiment of the disclosure, quick-response heating elements for the generation of infrared radiation in the range of approximately 0.8-5 µm are provided. The response times of these quick-response heating elements, i.e. the time from the cold condition up to reaching the radiation peak, preferably is a few seconds, in particular less than 10 seconds and particularly preferred less than 5 seconds. The infrared radiation in the range of approximately 0.8-5 µm of these quick-response heating elements is in particular generated by one or a plurality of resistance heating conductors, preferably made from tungsten and/or molybdenum and/or carbon or from a combination of a plurality of the stated resistance heating conductors configured as a wire and/or a wire helix and/or a band. In addition, it is particularly preferred that the resistance heating conductor(s) is/are respectively arranged in a gas-filled chamber made from a material which is permeable to infrared radiation and heat-resistant up to at least 1100° C., in particular quartz glass or other suitable materials.

In the firing chamber, a heating device having one or a plurality of quick-response heating elements can be arranged. These may be heating elements of identical configuration and may thus emit infrared radiation in the same wavelength range. However, it is also possible to provide different heating elements having different emissions peaks. This can in particular be realized by the use of different materials or material compositions of the resistance heating conductors. Furthermore, the individual elements can be of different configurations with regard to their shape and/or arrangement in the furnace. In addition, it is possible that the individual heating elements are operated in a different manner with the aid of a controller. For example, the individual heating elements can be controlled at different times and/or with different outputs. This is in particular possible depending on the ceramic element to be fired, e.g. with regard to the material and/or the shape and/or the size of the ceramic element.

The at least one quick-response heating element is preferably configured as an elongate body.

For further improving the firing quality and for reducing the firing times, it is preferred that at least one reflection element is arranged in the firing chamber. By means of the reflector element the infrared radiation emitted by the at least one quick-response heating element is directed towards the ceramic element to be fired. Preferably, the at least one heating element, which is in particular of a cylindrical configuration, is at least partially surrounded by the reflector element. In particular, the cross-section of the reflector element is parabolic or approximately parabolic, if possible, to ensure in an effective manner a corresponding reflection/deflection of the radiation emitted by the at least one quick-response heating element towards the ceramic element. Here, it is particularly preferred that the at least one reflector element is configured as an elongate body. This body preferably extends over the overall heating length of the respective heating element which has a parabolic, cylindrical or similar configuration, for example. Thereby, the effectiveness of the dental furnace according to the disclosure can be considerably increased.

In addition, it is preferred that the at least one reflection element is arranged on an inner surface of the chamber walls defining the firing chamber. Depending on the installation position, the heating elements and also the corresponding reflection elements can in particular be horizontally or vertically oriented. Of course, other orientations and combinations of different orientations are also possible. According to a preferred aspect of the disclosure, the chamber walls comprise a heat insulation.

According to a particularly preferred aspect of the disclosure, a receiving element, such as a firing table, for receiving a ceramic element is provided in the firing chamber. Here, the receiving element is made from a radiation-absorbing material or comprises a radiation-absorbing material. In particular, the receiving element comprises a material which absorbs infrared radiation to a large extent such that the receiving element, in particular in connection with the quick-response active heating element(s), serves as an additional (passive) heating element. The ceramic element is additionally heated from below by heat radiation and from inside by heat conduction by this passive heating element. This leads to a uniform distribution of the heat over the overall ceramic element resulting in an improvement of the quality, as well as a shortened firing time and thus saving of energy. It is particularly preferred that the receiving element is made of a dark, in particular black, material for better radiation absorption and thus quicker heating. Particularly preferred is the use of silicon carbide, wherein the receiving element preferably comprises silicon carbide and is in particular made from silicon carbide.

For avoiding heat dissipation from the receiving element into a chamber wall, into a chamber bottom or the like, the receiving element preferably comprises spacers for insulation purposes such that the contact surface between the receiving element and the corresponding chamber bottom is as small as possible.

In addition, in the furnace preferably a temperature measuring device is arranged. Here, the temperature measuring device is in particular not arranged in the upper area or an edge area of the furnace but near the ceramic element to be fired. As a temperature measuring device preferably a temperature measuring device usually used in dental furnaces is used.

The use according to the disclosure of the quick-response infrared heating elements in the range of approximately 0.8-5 µm does not only offer the advantage that the IR radiation deeply penetrates the ceramic element to be fired and causes good drying, but also that a quick and uniform firing of the ceramic element is performed. In particular, the furnace according to the disclosure requires no or only little preheating. Furthermore, the cooling times are considerably shorter than in the case of conventional furnaces such that the furnace is ready for the next firing operation after a short time.

In addition, the use of the quick-response infrared heating elements in the range of approximately 0.8-5 µm does not only result in shorter operating times but also in constant, very consistent and high-quality firing results. Furthermore, an exacter control of the firing process is possible. This is in particular advantageous when modern materials with very small uniform particle sizes (nanoparticles) are used.

BRIEF DESCRIPTION OF THE DRAWINGS

Hereunder the disclosure is explained in greater detail on the basis of a preferred embodiment with reference to the accompanying drawing in which:

FIG. 1 shows a schematic sectional view of a dental furnace according to the disclosure.

DETAILED DESCRIPTION OF THE PREFERRED EMBODIMENT

The schematically illustrated and strongly simplified furnace comprises a firing chamber. The latter is defined by thermally insulated chamber walls, side wall 12, top 14 and bottom 16. The thermal insulation of the top 14 comprises two parabolic recesses 18 in the longitudinal direction, i.e. perpendicular to the drawing level. In these recesses a cylindrical heating element 20 also extending in the longitudinal direction perpendicularly to the drawing level is respectively arranged. The heating device may respectively comprise a plurality of heating elements 20. In particular, per heating element 20 at least one IR emitter is provided. Depending on the installation position, the orientation of the heating elements 20 may also be horizontal, transverse or the like, for example.

The housing bottom 11 and the firing chamber are adapted to be vertically displaced relative to each other in the direction of an arrow 22 for opening and closing the firing chamber. The housing bottom 11 comprises an insulation body 16 which, in the closed condition, forms a side wall or a bottom wall of the firing chamber. At the insulation element 24 a receiving element 26 is arranged. The latter is made from a dark material having good absorption properties in the IR range, in particular silicon carbide. The receiving element 26 comprises spacers or feet 28 such that the receiving element 26 is insulated from the insulation element 16 and heat transfer takes place only to a small extent. On an upper side 30 of the table-like receiving element 26 a ceramic element 31 to be heated or to be fired, such as a dental prosthesis, is arranged. In addition, in the area of the ceramic element 31 a temperature measuring device 34 in particular connected with a furnace controller is arranged.

In addition, on a side of the heating elements 20 facing away from the firing element, reflection elements 36 are arranged in the half-cylindrical recesses 18. With the aid of the reflection elements 36 the IR radiation emitted by the heating elements to the side and upwards is directed towards the ceramic element 32.

Further, for the side walls 12 as well as for the top element 14 a material for heat insulation is provided.

For firing the ceramic element 32, the latter is arranged on the receiving element 26 and the furnace is closed by displacing the housing bottom 11 together with the thermal insulation 16 in the direction of the arrow 22. Subsequently, the heating elements 20 are regulated with the aid of the controller such that, by using the IR emitters, a uniform heating and firing of the ceramic element 31 takes place.

What is claimed is:

1. A dental furnace for firing dental-ceramic compounds, comprising
    a firing chamber for receiving ceramic elements to be fired;
    a heating device for heating/firing said ceramic elements;
    a receiving element arranged in the firing chamber for receiving the ceramic elements;
    wherein said receiving elements comprises a radiation-absorbing material which in particular absorbs infrared radiation such that said receiving element serves as an additional heating element; and
    wherein said heating device comprises at least one quick-response heating element for producing IR radiation in the range of between about 0.8-5 µm.
2. The dental furnace according to claim 1, wherein the at least one quick-response heating element is provided for the generation of the infrared radiation.
3. The dental furnace according to claim 1, wherein the at least one quick-response heating element is provided for the firing chamber.
4. The dental furnace according to claim 1, wherein the heating of the at least one quick-response heating element from a cold condition up to reaching a radiation peak takes place in less than 10 seconds.
5. The dental furnace according to claim 1, wherein the at least one quick-response heating element and, optionally, the associated chamber are configured as an elongate or curved body.
6. The dental furnace according to claim 1, wherein in the firing chamber at least one reflection element is arranged for directing the radiation emitted by the at least one quick-response heating element towards the ceramic element.
7. The dental furnace according to claim 6, wherein the at least one quick-response heating element is partially surrounded by the reflector element.
8. The dental furnace according to claim 6, wherein the reflector element is parabolic as seen in cross-section.
9. The dental furnace according to claim 6, wherein the reflection element is configured as an elongate, in particular a partially cylindrical body which preferably extends over the overall heating length of an associated heating element.
10. The dental furnace according to claim 1, wherein the at least one reflection element is arranged on an inner surface of chamber walls defining the firing chamber.
11. The dental furnace according to claim 10, wherein the chamber walls defining the firing chamber comprise a heat insulation.
12. The dental furnace according to claim 1, wherein the receiving element is insulated from chamber walls, in particular arranged at a distance thereto.
13. The dental furnace according to claim 1, further comprising a temperature measuring device is provided in the firing chamber in the vicinity of the ceramic element to be fired.
14. A dental furnace for firing dental-ceramic compounds, comprising:
    a firing chamber for receiving ceramic elements to be fired, and a heating device for heating and/or firing said ceramic element;
    wherein said heating device comprises at least one quick-response heating element for producing IR radiation in the range of between about 0.8-5 µm; and
    wherein the heating of the at least one quick-response heating element from a cold condition up to reaching a radiation peak takes place in less than 10 seconds.

* * * * *